(12) United States Patent
Govila et al.

(10) Patent No.: US 11,800,168 B2
(45) Date of Patent: *Oct. 24, 2023

(54) GENERIC STREAMING MEDIA DEVICE CONFIGURED AS SET TOP BOX

(71) Applicant: Apple Inc., Cupertino, CA (US)

(72) Inventors: Mayank Govila, San Jose, CA (US); Jared E. Rogers, Morgan Hill, CA (US); Vinesh Pallen, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/160,577

(22) Filed: Jan. 28, 2021

(65) Prior Publication Data

US 2021/0227277 A1 Jul. 22, 2021

Related U.S. Application Data

(63) Continuation of application No. 16/359,056, filed on Mar. 20, 2019, now Pat. No. 10,924,793.

(Continued)

(51) Int. Cl.
*H04N 21/2665* (2011.01)
*H04N 21/418* (2011.01)
(Continued)

(52) U.S. Cl.
CPC ..... *H04N 21/2665* (2013.01); *H04N 7/17318* (2013.01); *H04N 21/25816* (2013.01); *H04N 21/4182* (2013.01); *H04N 21/41407* (2013.01)

(58) Field of Classification Search
CPC ......... H04N 21/2665; H04N 21/25816; H04N 21/41407; H04N 21/4182; H04N 7/17318
See application file for complete search history.

(56) References Cited

U.S. PATENT DOCUMENTS

| 5,982,363 A | 11/1999 | Naiff |
| 7,010,600 B1 | 3/2006 | Prasad et al. |

(Continued)

FOREIGN PATENT DOCUMENTS

CN 1315326 C 5/2007

OTHER PUBLICATIONS

PCT International Search Report and The Written Opinion of the International Searching Authority for PCT/US2019/026181 dated Jun. 21, 2019, 16 pages.

(Continued)

*Primary Examiner* — Chenea Davis
(74) *Attorney, Agent, or Firm* — Womble Bond Dickinson (US) LLP

(57) ABSTRACT

Methods and systems are described for setting up, in one embodiment, a generic streaming media device as a set-top box for a multichannel content provider that provides a content delivery service. The set up process can be performed automatically and as background operations while a user manually sets up the device, in foreground operations, for use with an online streaming media store or source of content. The set up process can use a device token that was previously associated with the multichannel content provider for use with the device during the set up process. The device token can be stored by the developer of the device and sent by the developer to the multichannel content provider during a set up process of the device; the device token can be opaque to the developer but provides information used by the multichannel content provider to set up the device as a set top box.

24 Claims, 9 Drawing Sheets

Related U.S. Application Data

(60) Provisional application No. 62/679,900, filed on Jun. 3, 2018.

(51) Int. Cl.
  *H04N 21/258* (2011.01)
  *H04N 21/414* (2011.01)
  *H04N 7/173* (2011.01)

(56) References Cited

U.S. PATENT DOCUMENTS

| | | | |
|---|---|---|---|
| 9,602,775 B2 | 3/2017 | Barnett, Jr. | |
| 2004/0123315 A1 | 6/2004 | Na | |
| 2010/0017821 A1 | 1/2010 | Leonov et al. | |
| 2010/0023962 A1* | 1/2010 | Blommaert | H04L 67/303 |
| | | | 380/259 |
| 2011/0078757 A1* | 3/2011 | Poli | H04N 21/6581 |
| | | | 725/120 |
| 2013/0074168 A1 | 3/2013 | Hao et al. | |
| 2014/0101736 A1* | 4/2014 | Mays | H04L 63/0807 |
| | | | 726/5 |
| 2017/0134778 A1* | 5/2017 | Christie | H04N 21/8456 |
| 2018/0324183 A1* | 11/2018 | Straub | H04L 63/0884 |

OTHER PUBLICATIONS

PCT International Preliminary Report on Patentability for PCT/US2019/026181, dated Dec. 17, 2020, 10 pages.

\* cited by examiner

GENERIC STREAMING MEDIA DEVICE CONFIGURED AS SET TOP BOX

This application is a continuation of co-pending U.S. application Ser. No. 16/359,056 filed Mar. 20, 2019, which claims the benefit of priority to U.S. Provisional Patent Application No. 62/679,900, filed Jun. 3, 2018, both of which are incorporated by reference in their entirety.

BACKGROUND

This disclosure relates to content providers such as cable TV providers and also relates to generic streaming media devices such as the Apple TV from Apple Inc. of Cupertino Calif. or the Roku streaming players from Roku, Inc. of Los Gatos Calif.

Content providers such as cable TV providers use dedicated hardware for set-top boxes and these set-top boxes use a cable card to authenticate the set top box to the cable TV provider. The cable card is dedicated to operate with the cable TV provider and includes cryptographic information which is used in the authentication process to ensure that the cable TV provider is providing content delivery through the set top box in a secure manner that can be controlled by the cable TV provider. Cable TV providers are one example of the type of content providers that can be referred to as multiple channel video programming distributors.

Generic streaming media devices such as the Apple TV or the Roku players from Roku, Inc. of Los Gatos Calif. can be used to stream content from sources such as iTunes, etc., but these generic streaming media devices do not include dedicated hardware for authenticating the device to content providers such as cable TV providers or other types of providers that can be considered to be multiple channel video programming distributors.

SUMMARY OF THE DESCRIPTION

The embodiments described herein provide methods and systems for using a generic streaming media device, such as the Apple TV device or other generic streaming media devices, as a set-top box. This set-top box, once configured, can be used to deliver content from a multichannel content provider such as cable TV providers and other examples of multiple channel video programming distributors. The streaming media device can be considered generic because it is not dedicated by hardware for use with a particular multichannel content provider. In one embodiment, a set up process for a generic streaming media device can be performed automatically and as background operations while a user manually sets up the device, in foreground operations, for use with an online streaming media store or source of content such as iTunes or Amazon or NetFlix, etc. Thus, while the user is manually in foreground operations setting up the generic streaming media device for use with an online streaming media store or source of content, in the background, the device can be set up automatically for use (without requiring input of user credentials) with a multichannel content provider to allow the device to act as a set-top box for the multichannel content provider. In one embodiment, the set up process can use a device token that was previously associated with the multichannel content provider (e.g. generated by or for the multichannel content provider) for use with the particular device as identified by a device identifier prior to the set up process. The device token can be stored by the developer of the device and sent by the developer to the multichannel content provider during a set up process of the device when the device contacts an activation server used by a developer of the device. The device token can be opaque to the developer but can provide information that is used by the multichannel content provider to set up the device as a set-top box for the multichannel content provider.

In one embodiment, a method can include the following operations: establishing, by a device, communication with one or more activation servers to set up the device, the device including a generic streaming media device which is capable of setting up an account with an online streaming media source; providing, by the device to the one or more activation servers, a device identifier that identifies the device to a multichannel content provider, the device identifier having been associated with the multichannel content provider through a prior action by the multichannel content provider or by a developer of the device or by a developer of the operating system of the device; receiving, at the device, a device token containing data associated with the multichannel content provider (MCCP) for the device (e.g. the data was created by or for the MCCP) and wherein the device token is associated with the device identifier through the prior action; establishing, by the device, communication with one or more servers used by the multichannel content provider and sending, by the device to the one or more servers used by the multichannel content provider, the device token and an identifier of the multichannel content provider; exchanging, by the device, one or more messages with the one or more servers used by the multichannel content provider to authenticate the device for a content delivery service through the multichannel content provider, wherein the content delivery service uses a conditional access system, in one embodiment, for at least some of the content delivered through the multichannel content provider. In one embodiment, the device token and an endpoint identifier is received from the one or more activation servers or another server which was requested by the one or more activation servers to send the device token and the endpoint identifier to the device; in one embodiment, the endpoint identifier identifies at least one of the one or more servers used by the multichannel content provider. In one embodiment, the device does not include dedicated hardware logic that is configured to and dedicated to authenticating the device to a particular multichannel content provider. In one embodiment, the device does not need to be coupled via a particular network address in order to automatically authenticate the device with no inputs from the user; in other words, the authentication can occur through any network connection capable of allowing communication with the servers of the developer and the servers of the content provider. In one embodiment, the device identifier can be based on an immutable identifier stored in the device in secure memory within the device. In one embodiment, the device establishes communication with the one or more activation servers in response to a first time user boot up of the device, and the device establishes an Internet connection, through an Internet service provider, prior to establishing communication with the one or more activation servers. In one embodiment, the Internet connection can be through a wireless portion through a local wireless network, such as a Wi-Fi network in the vicinity of the device. In one embodiment, the device token can be opaque to the developer of the device or the developer of the operating system of the device.

In one embodiment, the device can establish communication with the one or more servers used by the multichannel content provider and can exchange one or more messages with the one or more servers used by the multichannel content provider in automatic background operations during a set up process in which the device can be set up manually by a user for the account with the online streaming media source which can be performed in foreground operations while the automatic background operations (e.g., a silent authentication process in which zero inputs are required from the user) are occurring to authenticate the device to the multichannel content provider. In one embodiment, no user credential inputs are required from the user during the background operations to set up the content delivery service through the multichannel content provider. In one embodiment, the device can also automatically download an application dedicated for use with the multichannel content provider for searching, browsing, and selecting and viewing content provided by the multichannel content provider. In one embodiment, the multichannel content provider cannot control the device like a dedicated set-top box provided by the multichannel content provider.

The methods and systems described herein can be implemented by data processing systems, such as one or more smart phones, tablet computers, desktop computers, laptop computers, smart watches, wearable devices, audio accessories, onboard computers, and other data processing systems and other consumer electronic devices. The methods and systems described herein can also be implemented by one or more data processing systems which execute executable computer program instructions, stored in one or more non-transitory machine readable media or medium that cause the one or more data processing systems to perform the one or more methods described herein when the program instructions are executed. Thus, the embodiments described herein can include methods, data processing systems, and non-transitory machine readable media such as DRAM memory and flash memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The embodiments are illustrated by way of example, and not limitation, in the figures of the accompanying drawings in which references with like numbers indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments described herein can be used to configure a generic streaming media device, such as an Apple TV device or a Roku player, as a set-top box for a particular multichannel content provider out of a set of possible multi-channel content providers that have registered. A method in one embodiment can be performed at first user boot up time of the device when the device is in a set up mode and when the user is configuring the device by manually entering through a keyboard (virtual on-screen or real), or other input mechanism, user credentials and other information to configure the device. At the same time while the user is entering data through an input device, operations in the background can be performed to configure the device to act as a set-top box for a particular multichannel content provider. In one embodiment, a device token which was previously associated with a device identifier of the device can be downloaded to the device from one or more activation servers or other servers acting on behalf of the one or more activation servers. The device token can contain data that is opaque to the developer of the device or the developer of the operating system of the device and was generated for the device by the particular multichannel content provider to use the device as a set-top box for a content delivery service through the particular multichannel content provider. In one embodiment, the activating and authenticating of the device with the multichannel content provider can use the device token and can be performed without requiring the user to enter user credentials such as username, password, etc.

Figure 1:
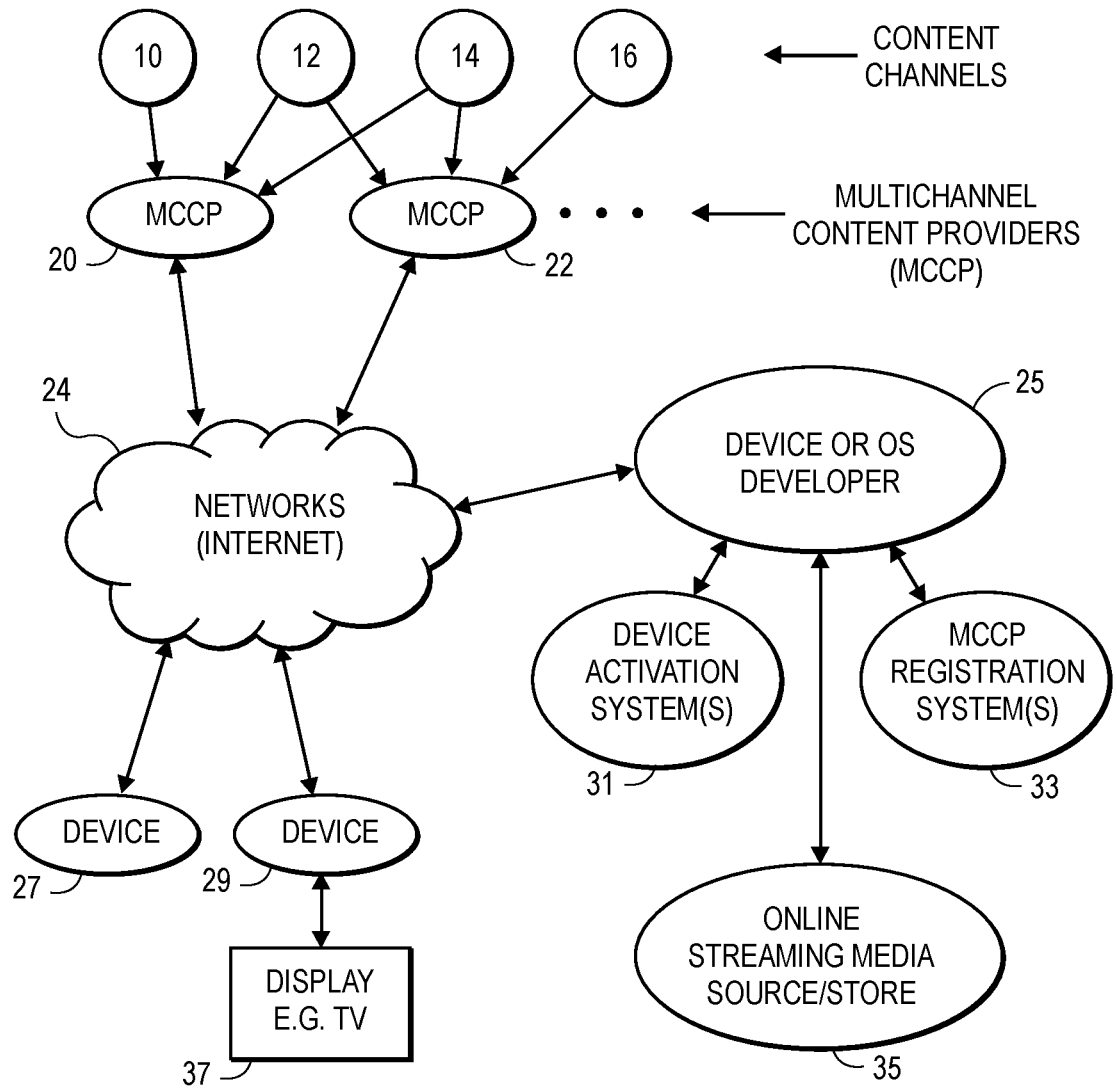
FIG. 1 shows an example of a system which can include several multichannel content providers (mccp) and several devices, each of those devices being capable of being configured as a set-top box for one or more of the multichannel content providers.

FIG. 1 shows an example of a system which has multiple components and multiple entities that can interact to provide content delivery to a plurality of devices, such as a plurality of generic streaming media devices. FIG. 1 shows two devices 27 and 29 which can be generic streaming media devices such as Apple TV devices or Roku players or other such devices. These generic streaming media devices can be considered generic because they do not include hardware, such as dedicated authentication hardware, that is dedicated to operate with a single, particular multichannel content provider. It will be appreciated that there can be millions of such devices distributed around the world and coupled through the Internet to a plurality of multichannel content providers as well as to the developer 25 which can be the developer of the devices such as devices 27 and 29 or the developer of the operating system used on the devices 27 or 29. These devices can be coupled to one or more networks 24 which can be the Internet in one embodiment. Both devices can be coupled to a display device such as a TV 37 or one device could be coupled to a TV while another device uses a built-in display such as a touchscreen on the device. The devices shown in FIG. 1 can be developed by a developer (e.g., Apple or Roku) of the device such as the developer 25 shown in FIG. 1. In one embodiment, the developer 25 of the device or the operating system of the device is an entity which is different than the multichannel content providers, such as multichannel content providers 20 and 22. The multichannel content providers 20 and 22 are coupled to the Internet 24, and each is coupled to receive a plurality of content channels, such as content channels 10, 12, 14, and 16. These content channels can be, for example, ESPN, NBC, CBS, FOX, ABC, TNT, etc. The multichannel content providers can be any one of the entities known as Comcast, Charter Communications, Dish Networks, Cox Communications, and other known multichannel content providers or multiple channel video programming distributors. In one embodiment, each generic streaming media device, such as device 27 and device 29 can be configured to act as a set-top box for more than one multichannel content provider. In one embodiment, the multichannel content providers can be considered to be aggregators of content and distributors of the aggregated content to subscribers of their content delivery service.

The developer 25 can use one or more device activation systems 31 and one or more MCCP registration systems 33 to provide for the automatic silent authentication of generic streaming media devices (such as the devices 27 and 29) to configure the devices to be set-top boxes for one or more multichannel content providers in one embodiment. The device activation systems 31 can be configured to receive and send communications with devices 27 and 29 when they are being first activated which can occur during a first user boot up of the device in one embodiment. The device activation systems 31 can enable the devices 27 and 29 to begin a set up process which can ultimately lead to entry of user account information for the online streaming media source 35 which can be in one embodiment the iTunes Store or Google Play Store or an Amazon store or other similar sources for online streaming media. In one embodiment, the online streaming media source 35 can include media such as songs, movies, TV shows, etc. The registration systems 33 can be configured to interact with the one or more multichannel content providers, such as multichannel content providers 20 and 22 in order to allow those providers to register with the developer to allow the set up of content delivery service through the multichannel content providers when the devices are configured to act as set-top boxes for the particular multichannel content provider.

Figure 2:
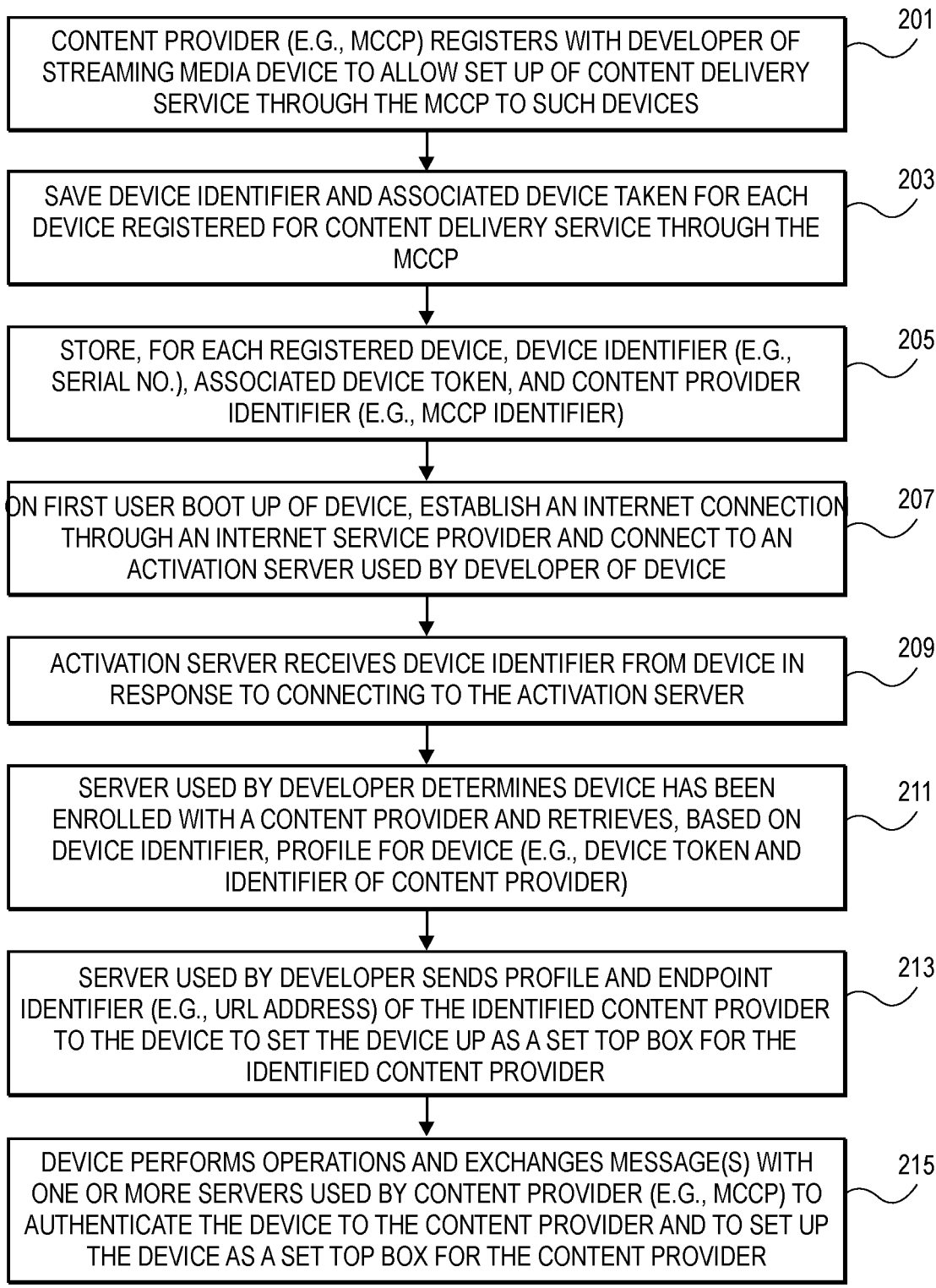
FIG. 2 is a flowchart which illustrates a method according to one embodiment described herein.

FIG. 2 shows an example of a method which can be used in the system shown in FIG. 1. In operation 201, a content provider such as a multichannel content provider can register with a developer, such as the developer 25 shown in FIG. 1, to allow the configuration of a generic streaming media device 29 to be set up as a set-top box to be operated with the particular multichannel content provider. For example, the multichannel content provider 20 can communicate through network 24 with the registration systems 33 to register the content provider 20 in the registration system. In one embodiment, the content provider can provide one or more device identifiers for one or more corresponding streaming media devices, such as devices 27 and 29. In one embodiment, each streaming media device can include a device identifier such as a serial number or other identifier which can be unique; this device identifier in one embodiment can be stored as immutable data in memory which is secure within the device. For example, the device identifier can be stored in read-only memory or can be stored in flash memory which is secured through a cryptographic system. The use of immutable data in secure memory provides a higher level of trust to the multichannel content providers that the device can be trusted. In one embodiment, the registration process in operations 201, 203, and 205 can involve the uploading of a set of device identifiers to the registration system 33. Prior to uploading each device identifier, the multichannel content provider can create (or cause to be created) an associated device token for each device that is being registered. The associated device token can be opaque to the developer which is receiving the device token but can be readable and understandable to the multiple channel content provider. For example, in one embodiment, the device token can include a representation of the device identifier, such as a hash of the device identifier, a representation of a particular user identifier if available, a representation of an identifier of the multichannel content provider, and other data which can be used in an authentication process to be described herein. The data in the device token can be encrypted with a secret known to the multichannel content provider. Thus, in one embodiment, the multichannel content provider can generate (or can cause to be generated) for each device identifier of a particular device an associated device token and cause that device identifier and associated device token to be stored in the registration system 33. In addition, the device token can be stored with an associated content provider identifier which identifies the multiple channel content provider that created (or caused the creation of) the associated device token for the particular device. In one embodiment, in operation 203, the multichannel content provider saves the particular device identifier and its associated device token for each device on one or more servers of the multichannel content provider. In operation 205, the registration system 33 stores, for each registered device, the device identifier and the associated device token and the associated content provider identifier. In one embodiment, a profile for the device can include the device token and the identifier of the content provider (which may be specified in metadata for the content provider), and this metadata can also include other information about the content provider such as an endpoint identifier, etc. In one embodiment, the registration system 33 may provide this information stored in operation 205 to the activation system 31 or to other systems operating within the domain of the developer 25 or otherwise used by the developer 25.

In operation 207, the device on first user boot up of the device establishes an Internet connection through an Internet service provider in one embodiment and then connects to an authentication server used by the developer of the device or used by the developer of an operating system of the device.

For example, device 27 can establish an Internet connection to the Internet 24 shown in FIG. 1 and through that Internet connection can then connect to an activation server in the activation system 31. The connection between the device and the activation server can be used to send the device identifier of the device to the activation server as shown in operation 209 of FIG. 2. In operation 211, the server used by the developer in the activation system (or in other systems controlled or used by the developer) can determine that the device has been enrolled with a content provider, such as a multichannel content provider and can retrieve, based on the device identifier, the profile for the device. In one embodiment, the profile can include the device token that was generated by the multichannel content provider as well as the identifier of the content provider. In operation 213, a server used by the developer can send the profile and an endpoint identifier, such as a URL address, of the identified content provider to the device to configure the device to act as a set-top box for the identified content provider. Then in operation 215, the device can perform one or more operations and exchange one or more messages with one or more servers used by the content provider, such as a multichannel content provider, to authenticate the device to the content provider and to set up the device as a set-top box for the content provider to allow delivery of content through the content provider to the device.

Figure 3:
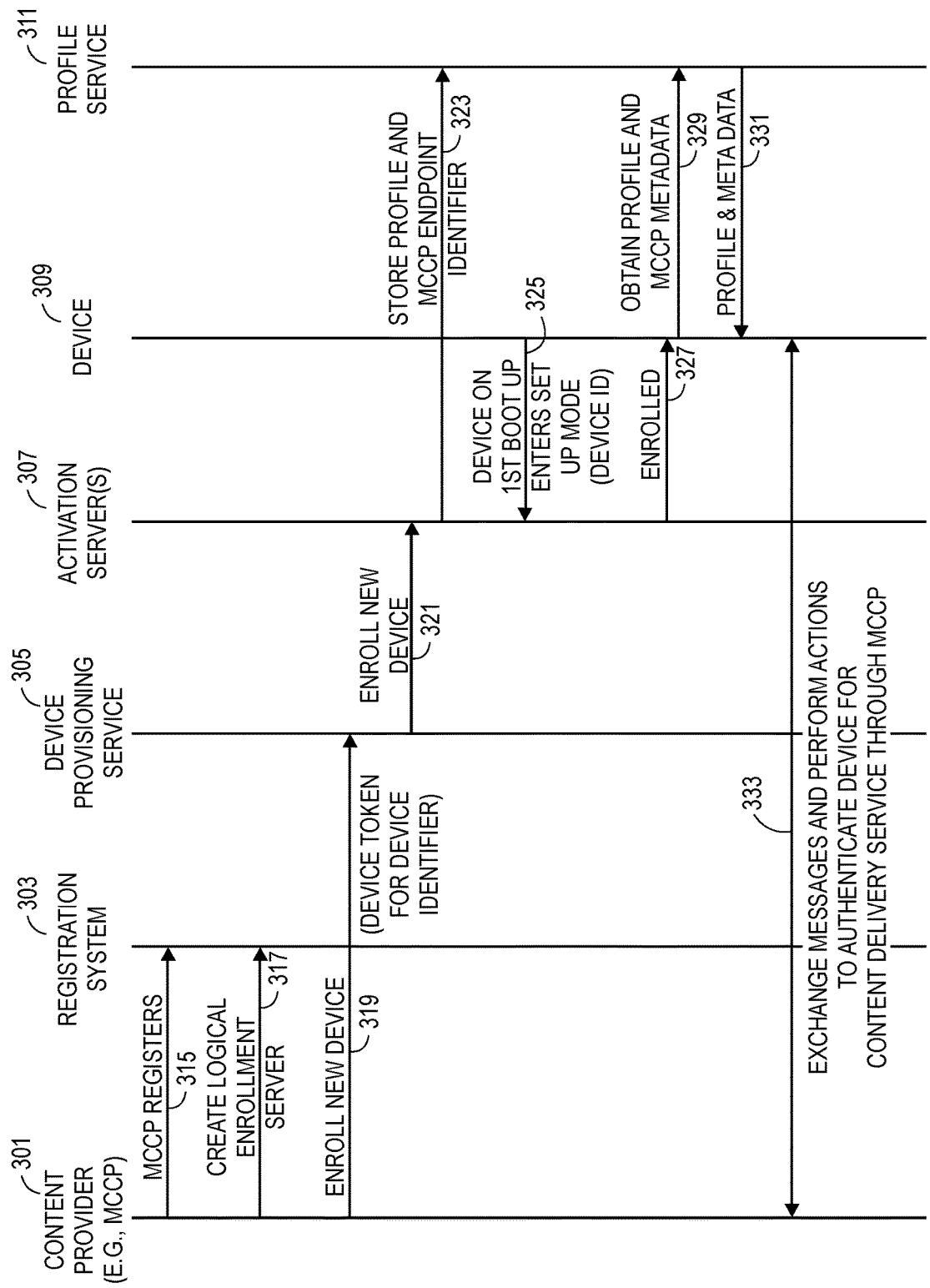
FIG. 3 shows a flow over time of data between various components in a system, such as the system shown in FIG. 1.

FIG. 3 shows a sequence in time of a plurality of operations (beginning with operation 315 which is followed with operation 333 sometime later) which can occur between a plurality of components operated by at least the developer of the device 309, the user of the device 309 and a content provider 301. The content provider 301 can use one or more systems (such as server systems) to perform the operations done by content provider 301. The developer (such as developer 25) of the device or the developer of the operating system of the device, such as device 309, can use one or more server systems to provide the registration system 303 and the device provisioning system 305 and the activation server 307 and the profile service 311. The registration system 303 in FIG. 3 can be part of registration systems 33 shown in FIG. 1. Similarly, the activation server 307 in FIG. 3 can be part of the device activation systems 31 shown in FIG. 1. In operation 315, the content provider 301 can register with registration system 303 of the developer. In one embodiment, this registration in operation 315 can include generating an identifier for the particular content provider (such as a unique vendor identifier) and generating or storing other information and storing all of that information as part of the registration information for the particular content provider in the registration system 303. In one embodiment, the unique vendor identifier is mapped to information such as metadata information about the multichannel content provider, and the vendor identification or identifier can be used to retrieve relevant information (e.g., metadata) related to the content provider including, for example, authentication endpoints, related application information, such as application information identifying a particular application that can be installed on the device and which is dedicated to operate with the content delivery service of the multichannel content provider once the device has been set up as a set-top box for the multichannel content provider. In operation 317, the content provider 301 can cause the registration system 303 to establish a logical enrollment server 317 which can be used in the enrollment process of new devices, such as the enrollment process which occurs in operation 319.

Operation 319 can occur when a new device is enrolled so that it can be configured automatically in background operations as a set-top box for the content provider 301. In one embodiment, operation 319 can involve transmitting an identifier of the device, such as a serial number of the device or other device identifier along with an associated device token which has been generated by the content provider for that particular device identifier. In one embodiment, operation 319 can register a batch of devices in a batch registration process that identifies a plurality of device identifiers and a plurality of associated device tokens, one device token for each corresponding device identifier. Batch registration can occur as a result of a purchase by the content provider 301 of a plurality of streaming media devices from the developer, such as developer 25 shown in FIG. 1. Each of the devices purchased can then be enrolled by generating a device token for each device and then providing a combination of the device identifier and the device token for each device in operation 319. In the example shown in FIG. 3, the enrollment operation 319 can use a device provisioning service 305 which provides an exposed application programming interface (API) that can be used at set up time of the device to provision the device to act as a set-top box for the content provider 301. In one embodiment, this API can be used to program the device token into the device at set up time of the device. In one embodiment, a content provider may create (or cause to be created) the same device token for the same user (or set of users such as a family) who uses multiple devices so that in this example, multiple devices can have the same device token. After operation 319, the new device is enrolled in operation 321 with the activation server 307 by, for example, storing the device identifier for the particular enrolled device, and this device identifier can be used by the activation server 307 to retrieve the associated device token when the device first boots up and provides its device identifier to the activation server 307. In operation 323, a profile of the device (which can include the device token for the device and an identifier of the content provider) and an endpoint identifier for the content provider 301 is stored in a profile service 311 in one embodiment. In one embodiment, the endpoint identifier can be a URL address which can be used during the set up process to authenticate the device as further described below. The profile (stored in operation 323) in one embodiment can include the unique identifier for the content provider 301 and the device token for the particular device that has been enrolled in operation 321. After operation 323 has been completed, the device can then be set up automatically in a silent authentication manner to act as a set-top box for the content provider 301. This can begin in operation 325 which can be a first user boot up of the device. In one embodiment, the device may have previously been booted up in a factory (e.g., for testing of the device) but can then be reset to indicate that the next boot up is the user first boot up of the device. In operation 325, the device 309 contacts an activation server 307 and sends the device identifier of the device to the activation server 307. The activation server 307 uses the device identifier to determine that the device has been enrolled and returns in operation 327 in enrollment indicator to the device 309 which in turn causes the device in operation 329 to obtain the profile of the device from the profile service 311 and to also obtain metadata about the content provider 301. In one embodiment, the metadata may be included in the profile. In operation 331, the profile service 311 returns the profile and metadata to the device 309 which can then exchange one or more messages and perform one or more actions in operation 333 to authenticate the device for content delivery through the content provider 301.

In operation 333, the device 309 and the content provider 301 can exchange data which can be used in cryptographic operations to generate cryptographic data, such as authentication certificates or other types of cryptographic data that can be used to authenticate the device for a content delivery service through the content provider 301. In one embodiment, the exchange of messages can include downloading software from the content provider 301 in order to set up the device 309 to be a set-top box for the content provider 301. The downloaded software can be used in the authentication process and can be separate from an application which is used by the user to search, browse, and select content for viewing from the content provider 301 during use of the device by the user after the device has been configured to be a set top box for the content provider.

Figure 4A:
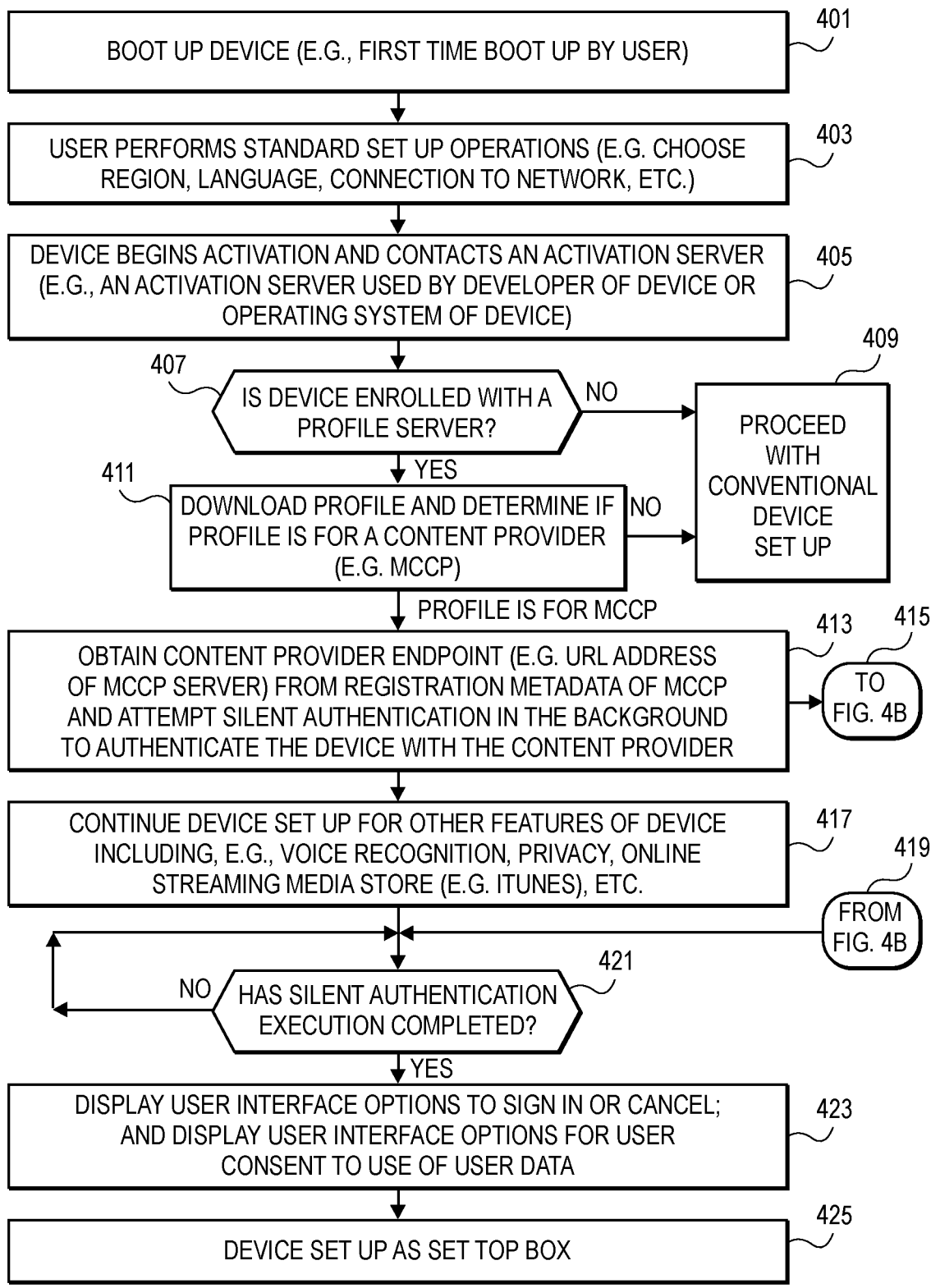
FIG. 4A, FIG. 4B, and FIG. 4C are flowcharts which illustrate a method according to one embodiment described herein.
Figure 4B:
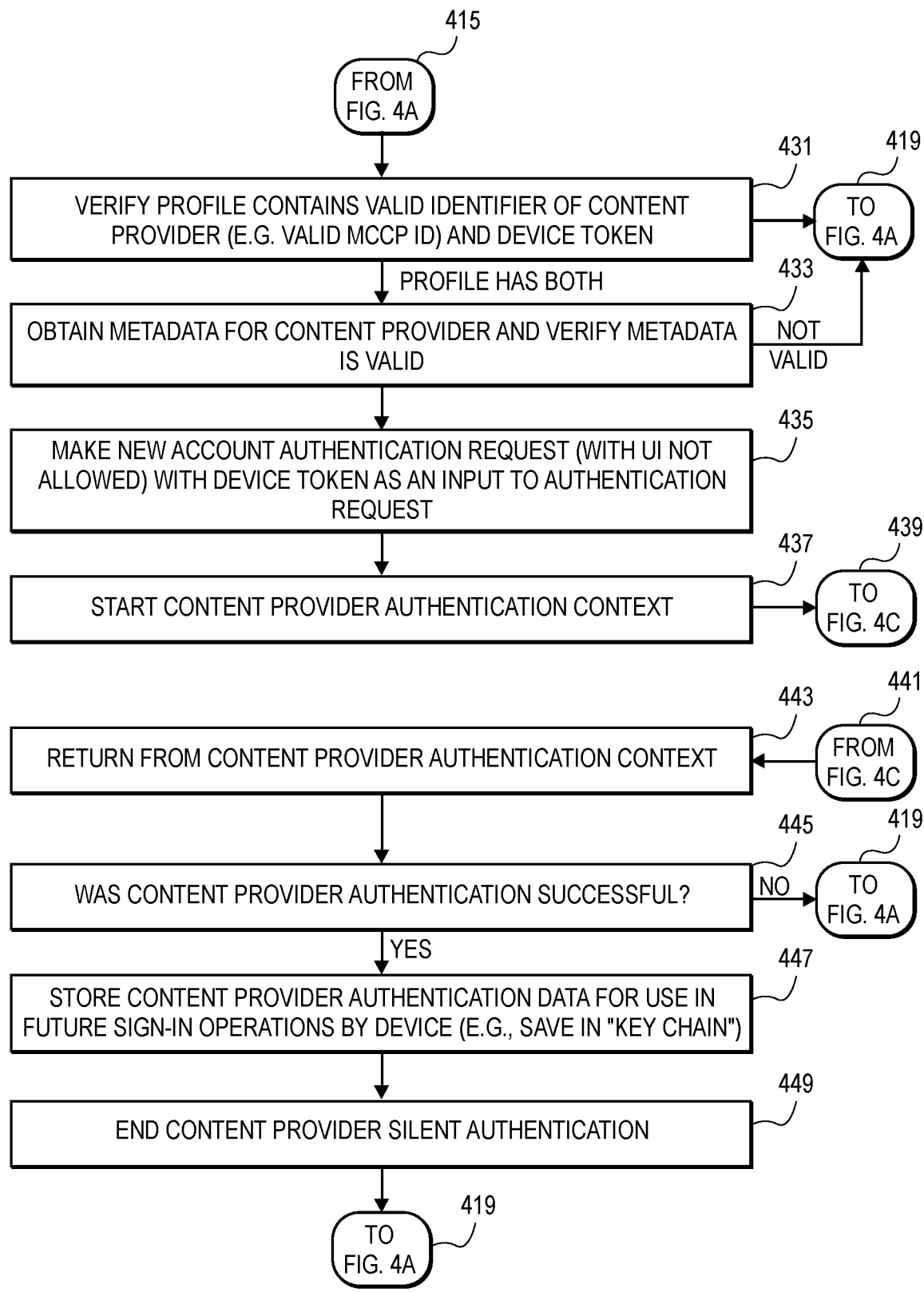
Figure 4C:
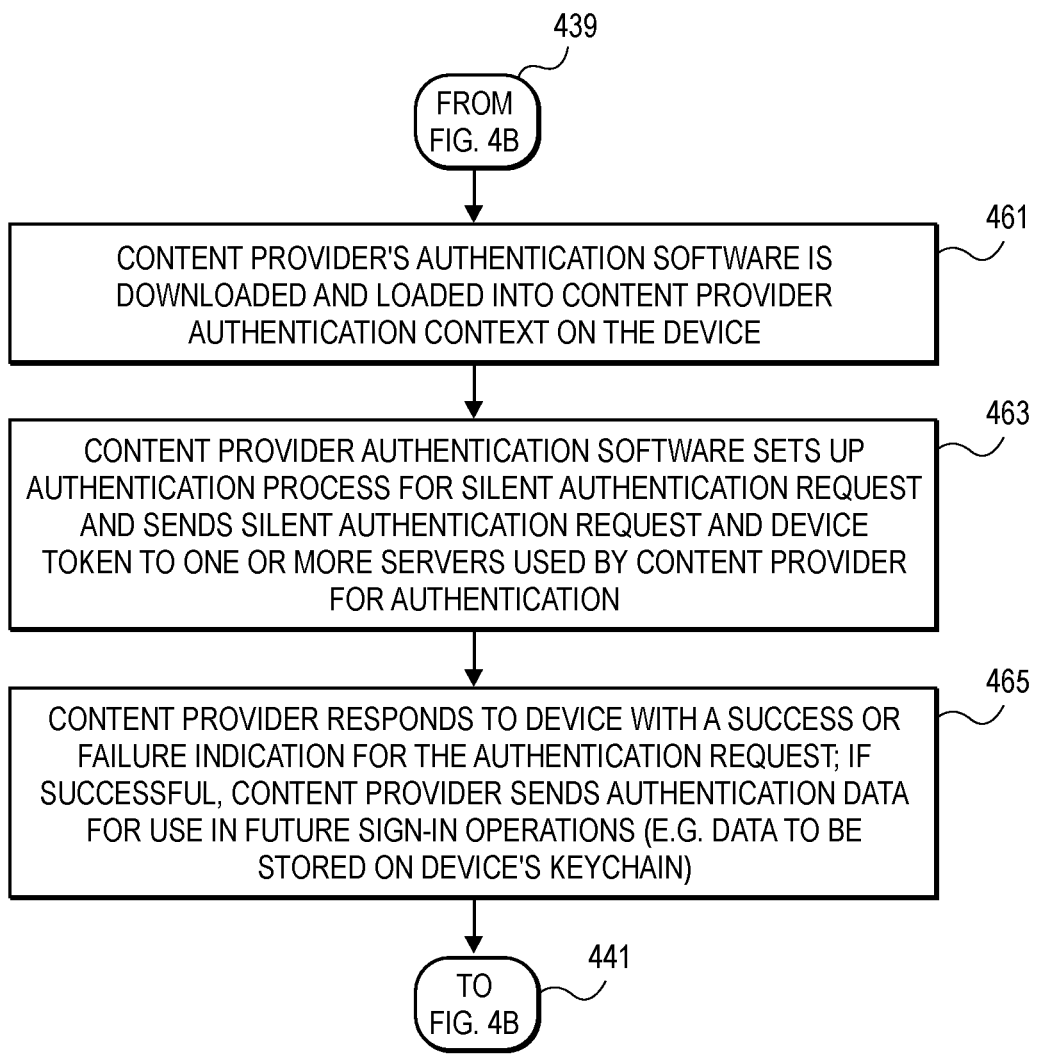

FIGS. 4A, 4B, and 4C provide a detailed example of the set up process performed by a generic streaming media device in one embodiment in which the device is set up as a set-top box through a silent authentication process that does not require user credential inputs such as username, password, etc. Moreover, this silent authentication process can occur in background operations while the user is in foreground operations inputting user credential information to sign up for or use an online streaming media service, such as the iTunes store service or Google Play, etc. In one embodiment, there is nothing in the hardware or firmware factory settings of the device that identifies the device to be a set-top box. During the set up operations, the operating system of the device identifies the device to be a set-top box which has profile information that can be used to set up the device as a set-top box for a particular content provider. In operation 401, the device is booted up, and this can be the first time that the device was booted up by the user; for example, the user has opened the box containing the device and set the device up next to a TV and has connected the device to the TV so that it can be used with the TV and then has turned the device on. In operation 403, the user can then perform standard set up operations such as choosing a geographic region, choosing a language, choosing a network connection type such as Ethernet or Wi-Fi, etc. In operation 405, the device can begin activation and can contact an activation server. The server can be an activation server such as activation server 307 shown in FIG. 3 or an activation system such as the activation systems 31 shown in FIG. 1. In one embodiment, the activation server can be a server used by the developer of the device or the developer of an operating system of the device. In operation 407, the activation server can determine whether the device has been enrolled with a profile server. If the device has not been enrolled with the profile server then processing proceeds to operation 409 in which conventional device set up operations are performed. If operation 407 determines that the device has been enrolled with the profile server, then in operation 411, the profile is downloaded to the device and the device determines whether the profile is for a content provider, such as a multichannel content provider. If the profile is not for a content provider processing proceeds to operation 409 in which the device is set up using conventional device set up operations. If the profile is for a content provider then processing proceeds to operation 413 in which the content provider's endpoint (for example a URL address to a server of the content provider) is obtained from the registration metadata of the content provider. In one embodiment, the profile contains the identifier for the content provider, and this identifier can be used to obtain the registration metadata of the content provider. After obtaining the content provider's endpoint, the device in operation 413 can attempt silent authentication in the background to authenticate the device with the content provider to be a set-top box for the content provider. Processing can then proceed through node 415 to FIG. 4B. The silent authentication process performed in the background (such as the process shown in FIGS. 4B and 4C) can occur while operation 417 occurs. In operation 417, the user can continue the device set up process by setting up other features of the device including, for example, voice recognition by speaking to the device, privacy set up by entering privacy related choices, and by setting up an account or activating an otherwise existing account with an online streaming media store, such as iTunes. Thus, the user can be providing manual inputs into the device in operation 417 while the silent authentication process in the background shown in FIGS. 4B and 4C is being performed without requiring any explicit user inputs during or as part of the silent authentication process which is performed in the background. In operation 421, the system repeatedly checks to determine whether the silent authentication execution process has been completed and if it has not it continues to loopback waiting for silent authentication to complete. Once silent authentication has been determined to have been completed in operation 421, processing can proceed to operation 423 in which various user interface options can be displayed to the user to allow the user to sign in or cancel the various options that are presented; moreover, operation 423 can also involve the display of user interface options related to user consent to the use of user data and other privacy related options and consents. After operation 423 has been completed, the device is then set up in operation 425 to act as a set-top box for the content provider.

As shown in FIG. 4B, processing of the silent authentication process can begin from node 415 by beginning with operation 431. In operation 431, the device can verify that the profile contains a valid identifier of a content provider and also contains a device token. If the profile contains both a valid identifier and a device token, processing can proceed to operation 433. If the profile does not contain both, then processing reverts back to node 419 which returns processing to operation 421 shown in FIG. 4A. In this instance, the user may be required to manually set up the device for service with a content provider. Referring back to FIG. 4B, in operation 433, the device obtains the metadata for the content provider and verifies the metadata is valid. If it is not valid, processing returns through node 419 back to operation 421 which may require manual user input of data in order to set up the device as a set-top box with a content provider. If operation 433 determines that the metadata is valid then in operation 435, the device makes a new account authentication request with the device token as an input to the authentication request. The request can include a flag which indicates that a user interface is not allowed to be presented to the user during the silent authentication process. The device in operation 437 starts a content provider authentication context and processing proceeds through node 439 to the method shown in FIG. 4C.

Referring now to FIG. 4C, operation 461 can cause the downloading in one embodiment of the content provider's authentication software to the device, and this software is then loaded into the content provider authentication context on the device. In operation 463, the content provider authentication software which was downloaded in operation 461 then sets up an authentication process for the silent authentication request and sends the silent authentication request and device token to one or more servers used by the content provider for authentication. In operation 465 the content provider can respond to the device with a success or failure indication for the authentication request. If successful, the content provider can in one embodiment send authentication data which is used in future sign in operations, and this authentication data can be stored on the device's keychain in the device. Thus, future sign in operations can use this authentication data to automatically in the background without user input sign into the content delivery service of the content provider. After operation 465, processing can proceed through node 441 back to the method shown in FIG. 4B. Referring back to FIG. 4B, in operation 443, the processing returns from the content provider authentication process and proceeds to operation 445 in which it is determined whether the content provider authentication process was successful. If it was not, processing proceeds back to node 419 which returns processing to operation 421 shown in FIG. 4A, and the set up process may require manual entry of user credentials or other data in order to set up the device as a set top box for the content provider. If it is determined in operation 445 of FIG. 4B that the content provider authentication was successful, then processing proceeds to operation 447 in which the content provider authentication data is stored for use in future sign in operations by the device and processing then can be completed in operation 449 and returned back to the method shown in FIG. 4A to complete the set up of the device.

Figure 5:
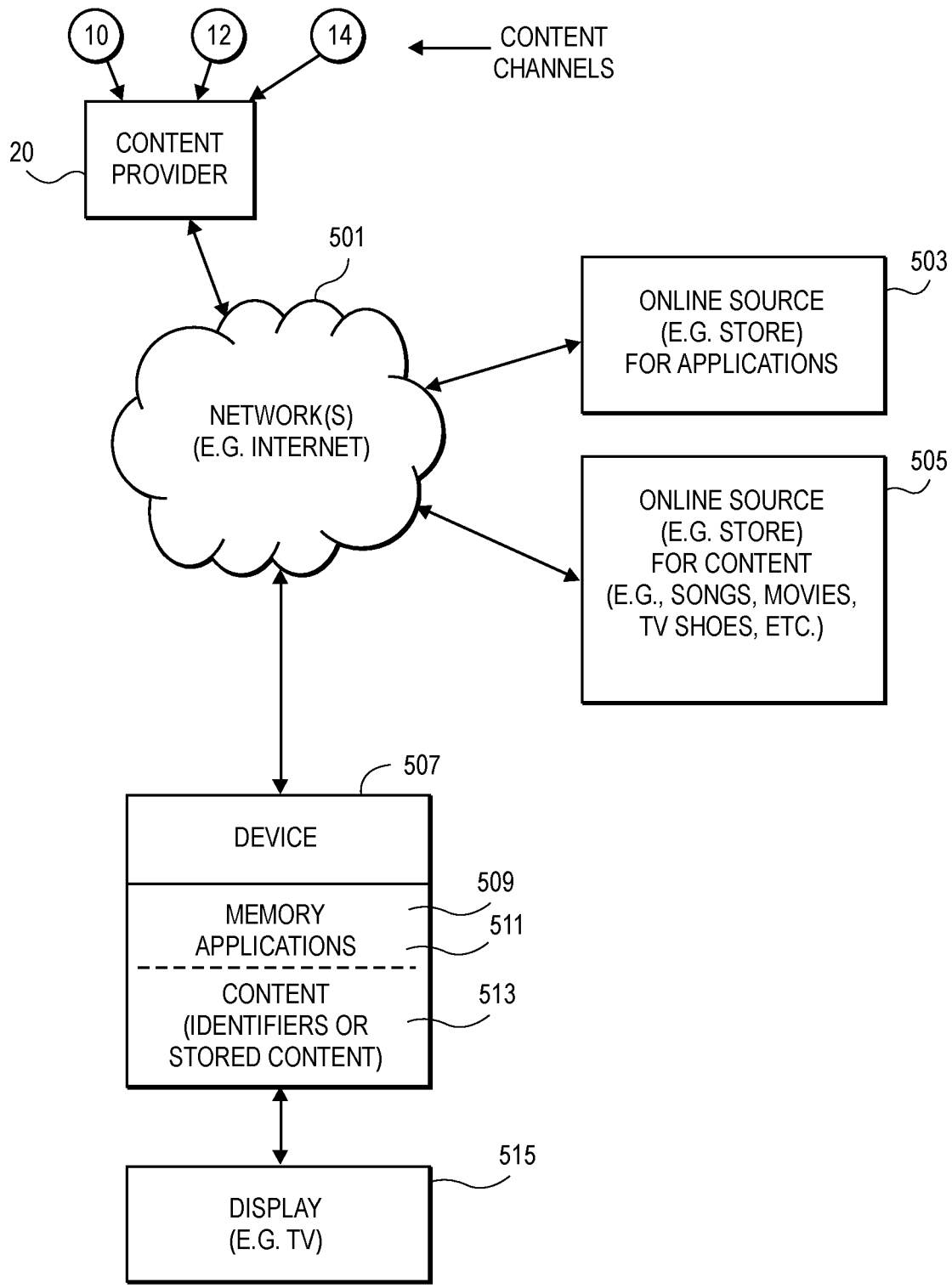
FIG. 5 shows an example of a system which includes at least one content provider which can be a multichannel content provider coupled through one or more networks, such as the Internet to at least one device which can be configured to be set up as a set-top box for one or more content providers such as one or more multichannel content providers.

FIG. 5 shows an example of a system which includes a device which can be a generic streaming media device that has been set up as a set-top box for content provider 20 which is coupled to the device 507 through the Internet 501. The content provider 20 can provide a plurality of different content channels, such as content channels 10, 12, and 14 as well as other potential content channels to the device 507 which is configured to operate as a set-top box for the content provider 20. In one embodiment, the content provider's user interface application that is configured for that particular content provider can be also downloaded and stored on the device 507, and that application can be used while in set-top box mode to search, browse, and select content to watch from the content provider 20. That application can be identified by an application identifier used in an on-line application store to identify the application so the application can be downloaded from the store using the identifier. The device 507, being a generic streaming media device in one embodiment can also obtain content from an online source, such as an online streaming media source or store and store the content in memory 509 on the device. In the example shown in FIG. 5, the online source 505 can be for example the iTunes Store and contain content for songs, movies, TV shows, etc. This content can be streamed to the device 507 and in some cases the content itself can be stored on the device 507, such as content 513. In those embodiments in which the content is streamed, identifiers for previously purchased streamed content can be stored on device 507. In addition, the device 507 in one embodiment is capable of processing applications which are available from an online source for applications, such as online source 503. In one embodiment, online source 503 is an application store from which applications can be purchased and downloaded to a device, such as device 507 and stored as applications 511 in the memory 509 on the device. For example, these applications can be video games, productivity applications, and other applications known in the art. These applications can be executed by the device and can allow the user to interact with the device 507 as if it was a computer. In one embodiment, the device 507 is coupled to a display such as a TV 515.

Figure 6:
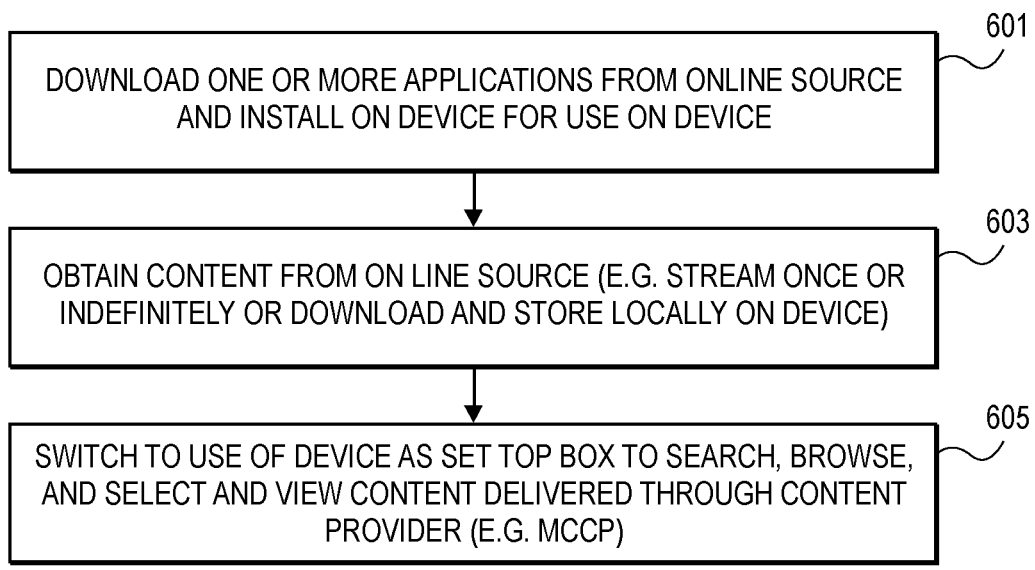
FIG. 6 is a flowchart which illustrates a method which can be performed by a generic streaming media device that has also been set up as a set-top box for one or more multichannel content providers.

FIG. 6 shows an example of a method for using the device 507 which can operate as a set-top box and which can all also operate to obtain streaming media from an online source such as online source 505. Moreover, the method shown in FIG. 6 shows that the device 507 is also capable of executing applications obtained from an online source for applications, such as online source 503. In operation 601, the device 507 can download one or more applications from an online source for applications and can cause those applications to be installed on the device for use on the device. In operation 603, the device can also obtain content, such as songs, movies, etc. from an online source. In one embodiment, the content can be purchased to be streamed once or streamed indefinitely. In other embodiments, it may be possible to download and store the content locally on the device, such as the downloading and storing of songs. Operation 605 shows that the device can be switched into set-top box mode after it has been configured to operate as a set-top box for one or more content providers such as one or more multiple channel content providers. In one embodiment, an application dedicated for use with a particular content provider can be used to operate that device as a set-top box during the set-top box mode to search, browse, and select content for viewing from the content provider.

Figure 7:
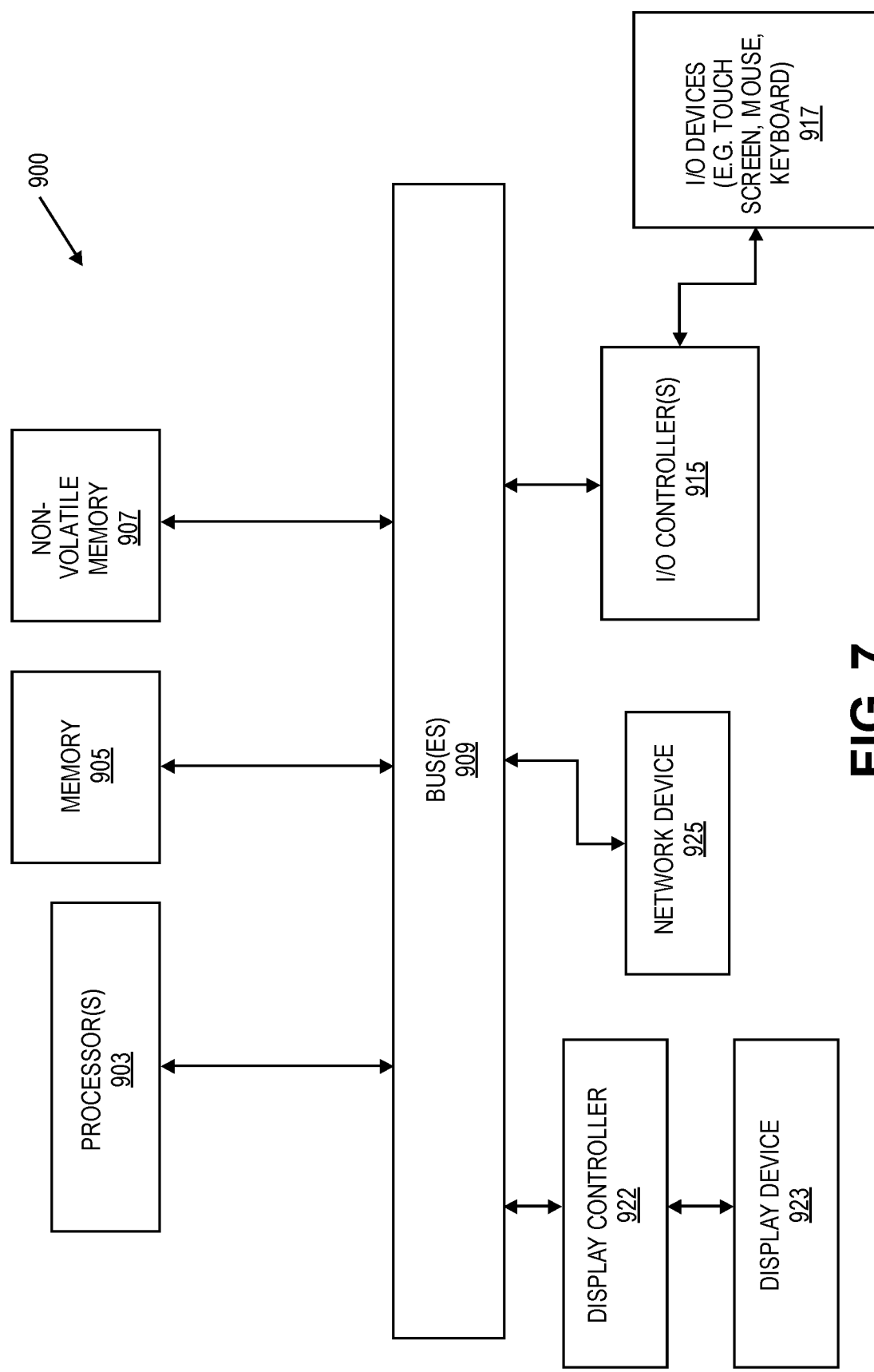
FIG. 7 shows an example of a data processing system which can be used to implement one or more embodiments described herein and which can be used as an implementation of a generic streaming media device and which can also be used as an implementation of the one or more servers described herein.

FIG. 7 is a block diagram of a data processing system 900 according to an embodiment. Note that while FIG. 7 illustrates the various components of a data processing system that may be incorporated into a mobile or handheld device, it is not intended to represent any particular architecture or manner of interconnecting the components as such details are not germane to the present invention. It will also be appreciated that other types of data processing systems that have fewer components than shown or more components than shown can also be used within the various embodiments.

The data processing system 900 includes one or more bus(es) 909 that serve to interconnect the various components of the system. One or more processor(s) 903 are coupled to the one or more bus(es) 909 as is known in the art. Memory 905 may be volatile DRAM or non-volatile RAM, such as NOR flash memory or other types of high-speed, non-volatile, execute-in-place memory. This memory can be coupled to the one or more bus(es) 909 using techniques known in the art. The data processing system 900 can also include explicitly non-volatile memory 907, such as data storage devices including one or more hard disk drives, flash memory devices or other types of memory systems that maintain data after power is removed from the system. The non-volatile memory 907 and the memory 905 can each couple to the one or more bus(es) 909 using known interfaces and connection techniques. A display controller 922 can couple to the one or more bus(es) 909 to receive display data, which can be displayed on a display device 923. In one embodiment the display device 923 includes an integrated touch input to provide a touch screen.

The data processing system 900 can also include one or more input/output (I/O) controllers 915 which provide interfaces for one or more I/O devices, such as one or more mice, touch screens, touch pads, and other input devices including those known in the art and output devices (e.g. speakers). The input/output devices 917 are coupled through one or more I/O controllers 915 as is known in the art.

While the data processing system 900 illustrates the memory 905 and non-volatile memory 907 as coupled to the one or more buses directly, in one embodiment the nonvolatile memory 907 can be remote from the data processing system 900, such as in a network storage device which is coupled to the data processing system through a network interface such as a modem, wireless LAN, or Ethernet interface. The bus(es) 909 can be connected to each other through various bridges, controllers and/or adapters as is well known in the art. In one embodiment the I/O controller 915 includes one or more of a USB (Universal Serial Bus) adapter for controlling USB peripherals or a Thunderbolt controller for controlling Thunderbolt peripherals. In one embodiment, one or more network device(s) 925 can be coupled to the bus(es) 909. The network device(s) 925 can be wired network devices (e.g., Ethernet) or wireless network devices (e.g., WI-FI, Bluetooth).

It will be apparent from this description that embodiments and aspects of the present invention may be embodied, at least in part, in software. That is, the techniques and methods may be carried out in a data processing system or set of data processing systems in response to the processors executing a sequence of instructions stored in a storage medium, such as a non-transitory machine readable storage media, such as volatile DRAM or nonvolatile flash memory. In various embodiments, hardwired circuitry may be used in combination with software instructions to implement the embodiments described herein. Thus the techniques and methods are not limited to any specific combination of hardware circuitry and software, or to any particular source for the instructions executed by the one or more data processing systems.

As described above, one aspect of the present technology is the gathering and use of data available from various sources to improve the delivery to users of TV content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve the delivery of TV content. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of content delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be delivered to users based on non-personal information data or a bare minimum amount of personal information, such as the content being requested by the device associated with a user, other non-personal information available to the delivery services, or publicly available information.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method to set up a device, the method comprising:
   establishing, by the device, communication with one or more activation servers to set up the device, the device comprising a generic streaming media device which is capable of setting up an account with an online streaming media source that is a different service from a multichannel content provider;
   providing, by the device to the one or more activation servers, a device identifier that identifies the device to the multichannel content provider, the device identifier having been associated with the multichannel content provider through a prior action by the multi-channel content provider or by a developer of the device or by a developer of an operating system of the device;
   receiving, at the device in response to providing the device identifier, a device profile containing data associated with the multichannel content provider for the device, the device profile including a device token for the device that was associated with the device through the prior action wherein the device token comprises a representation of the device identifier and the device identifier comprises an immutable identifier, and wherein the device profile is associated with the device identifier through the prior action, and receiving an endpoint identifier of the multichannel content provider;
   establishing, by the device using the endpoint identifier, communication with one or more servers used by the multichannel content provider and sending, by the device to the one or more servers used by the multichannel content provider, the device token;
   exchanging, by the device in background operations of the device, one or more messages with the one or more servers used by the multichannel content provider to authenticate the device for a content delivery service through the multichannel content provider without requiring a user input to perform the authentication, wherein the content delivery service uses a conditional access system for at least some of the content delivered through the multichannel content provider.

2. The medium as in claim 1, wherein the device token and an identifier of the multichannel content provider and the endpoint identifier are received from the one or more activation servers or another server which was requested by the one or more activation servers to send the device token and the endpoint identifier to the device, and wherein the endpoint identifier identifies a respective computer network address of the one or more servers used by the multichannel content provider and wherein the data in the device profile is created by the multichannel content provider or on behalf of the multichannel content provider, and wherein establishing the communication with the one or more servers comprises using, by the device, the respective computer network address of the one or more servers of the endpoint identifier.

3. The medium as in claim 2 wherein the device does not include dedicated hardware logic that is configured and dedicated to authenticating the device to the multichannel content provider.

4. The medium as in claim 3 wherein the immutable identifier is stored in the device in secure memory within the device.

5. The medium as in claim 1 wherein the device establishes communication with the one or more activation servers in response to a first time user boot up of the device, and wherein the device establishes an Internet connection, through an Internet service provider, prior to establishing communication with the one or more activation servers.

6. The medium as in claim 5 wherein the Internet connection includes a wireless portion through a local wireless network in the vicinity of the device.

7. The medium as in claim 5 wherein the device token is opaque to the developer of the device and is associated with the multichannel content provider by being created by or on behalf of the multichannel content provider.

8. The medium as in claim 5 wherein the device establishes communication with the one or more servers used by the multichannel content provider and exchanges one or more messages with the one or more servers used by the multichannel content provider in automatic background operations during a set up process in which the device is set up manually by a user for the account with the online streaming media source.

9. The medium as in claim 8 wherein no user credential inputs are required during the background operations to set up the content delivery service through the multichannel content provider, and wherein manual set up by the user of the account with the online streaming media source requires the user to enter user credential inputs including a user account name and a password, and wherein the online streaming media source includes one or more of: songs, movies, TV shows, applications for execution in the device, and content purchased by the user, and wherein the device operates as a set-top box for the multichannel content provider when in a set top box mode when a downloaded application of the multichannel content provider causes the device to enter the set top box mode.

10. The medium as in claim 9 wherein the multichannel content provider cannot control the device like a dedicated set-top box.

11. A method for setting up a device, the method comprising:
   establishing, by a device, communication with one or more activation servers to set up the device, the device comprising a generic streaming media device which is capable of setting up an account with an online streaming media source that is a different service from a multichannel content provider;
   providing, by the device to the one or more activation servers, a device identifier that identifies the device to the multichannel content provider, the device identifier having been associated with the multichannel content provider through a prior action by the multi-channel content provider or by a developer of the device or by a developer of an operating system of the device;
   receiving, at the device in response to providing the device identifier, a device profile containing data associated with the multichannel content provider for the device, the device profile including a device token for the device that was associated with the device through the prior action, wherein the device token comprises of representation of the device identifier and the device identifier comprises an immutable identifier, and wherein the device profile is associated with the device identifier through the prior action, and receiving an endpoint identifier of the multichannel content provider;

establishing, by the device using the endpoint identifier, communication with one or more servers used by the multichannel content provider and sending, by the device to the one or more servers used by the multichannel content provider, the device token;

exchanging, by the device in background operations of the device, one or more messages with the one or more servers used by the multichannel content provider to authenticate the device for a content delivery service through the multichannel content provider without requiring a user input to perform the authentication, wherein the content delivery service uses a conditional access system for at least some of the content delivered through the multichannel content provider.

12. The method as in claim 11, wherein the device token and an identifier of the multichannel content provider and the endpoint identifier are received from the one or more activation servers or another server which was requested by the one or more activation servers to send the device token and the endpoint identifier to the device, and wherein the endpoint identifier identifies a respective computer network address of the one of the one or more servers used by the multi-channel content provider and wherein the data in the device profile is created by or on behalf of the multichannel content provider, and wherein establishing the communication with one or more servers comprises using, by the device, the respective computer network address of the one or more servers of the endpoint identifier.

13. The method as in claim 12 wherein the device does not include dedicated hardware logic that is configured and dedicated to authenticating the device to the multichannel content provider.

14. The method as in claim 13 wherein the immutable identifier is stored in the device in secure memory within the device.

15. The method as in claim 11 wherein the device establishes communication with the one or more activation servers in response to a first time user boot up of the device, and wherein the device establishes an Internet connection, through an Internet service provider, prior to establishing communication with the one or more activation servers.

16. The method as in claim 15 wherein the Internet connection includes a wireless portion through a local wireless network in the vicinity of the device.

17. The method as in claim 15 wherein the device token is opaque to the developer of the device.

18. The method as in claim 15 wherein the device establishes communication with the one or more servers used by the multichannel content provider and exchanges one or more messages with the one or more servers used by the multichannel content provider in automatic background operations during a set up process in which the device is set up manually by a user for the account with the online streaming media source.

19. The method as in claim 18 wherein no user credential inputs are required during the background operations to set up the content delivery service through the multichannel content provider, and wherein manual set up by the user of the account with the online streaming media source requires the user to enter user credential inputs including a user account name and a password, and wherein the online streaming media source includes one or more of: songs, movies, TV shows, applications for execution in the device, and content purchased by the user, and wherein the device operates as a set-top box for the multichannel content provider when in a set top box mode when a downloaded application of the multichannel content provider causes the device to enter the set top box mode.

20. The method as in claim 19 wherein the multichannel content provider cannot control the device like a dedicated set-top box.

21. A non-transitory machine readable medium storing executable program instructions which when executed by a data processing system cause the data processing system to perform a method to set up a device as a set top box, the method comprising:

booting up the device in a set up mode, wherein the device is capable of setting up an account with an online streaming media source that is a different service from a multichannel content provider;

receiving at the device a device token previously associated with a device identifier of the device, the receiving being performed in a background operation, and the device token comprising data that is associated with a multichannel content provider to use the device as a set-top box for a content delivery service through the multichannel content provider, wherein the device token comprises a representation of the device identifier and the device identifier comprises an immutable identifier;

automatically activating and authenticating, using the device token and without requiring user credentials from a user of the device, the device to act as the set-top box for the multichannel content provider, the automatically authenticating being performed as background operations in the set up mode.

22. The medium as in claim 21 wherein the content delivery service uses a conditional access system for at least some of the content and wherein the content delivery service uses a downloaded application that executes on the device to allow browsing, searching, and selection of content in the content delivery service by using the device as a set-top box.

23. The medium as in claim 21 wherein a downloaded application is downloaded automatically to the device during the set up mode as a background operation, the downloaded application associated with the multichannel content provider.

24. The medium as in claim 23, wherein the device token is provided to the device after the device establishes communication with one or more servers that are used by a developer of the device or a developer of an operating system of the device, and wherein the data in the device token is opaque to the developer, and wherein an application identifier is provided to the device during the set up mode and the application identifier identifies the downloaded application.

* * * * *